United States Patent [19]

Beroth

[11] Patent Number: 5,169,209
[45] Date of Patent: Dec. 8, 1992

[54] SEAT BACK TRAY TABLE ASSEMBLY HAVING OPEN-ENDED CONNECTOR LEGS

[76] Inventor: Michael T. Beroth, 149 Tullries La., Lewisville, N.C. 27023

[21] Appl. No.: 757,231
[22] Filed: Sep. 10, 1991
[51] Int. Cl.⁵ ............................................. A47C 83/02
[52] U.S. Cl. ...................................... 297/146; 297/163
[58] Field of Search ............... 297/146, 112, 114, 144, 297/163–169, 173, 189, 191; 108/38, 134, 135; 16/273, 355, 356

[56] References Cited

U.S. PATENT DOCUMENTS

| 2,098,426 | 11/1937 | McDonald | 297/146 |
| 3,009,737 | 11/1961 | Burnett | 297/146 |
| 4,281,874 | 8/1981 | Iwans et al. | 297/163 |
| 4,353,146 | 10/1982 | Brockhaus | 16/273 X |
| 4,431,231 | 2/1984 | Elazari et al. | 297/167 X |
| 4,511,178 | 4/1985 | Brennan | 297/146 |
| 5,075,927 | 12/1991 | Porta | 16/273 |

Primary Examiner—Kenneth J. Dorner
Assistant Examiner—James M. Gardner
Attorney, Agent, or Firm—W. Thad Adams, III

[57] ABSTRACT

A seat-back tray table assembly attached to a vehicle passenger seat including a seat bottom, seat back and seat frame. The tray table assembly includes a tray table, a pair of elongate legs on which the tray table is mounted. The legs include first and second extensions projecting outwardly from the end of the pair of legs remote from the tray table and define respective stud-receiving recesses between the first and second extensions. A seat back pivot mounts the seat back on the seat frame for movement between a seating position with the seat back substantially upright and substantially perpendicular to the seat bottom and da break back position with the seat back forward and substantially parallel to the seat bottom. A tray table pivot is carried on the seat frame and include first and second pivot studs positioned on respective sides of the seat frame for being received in the stud receiving recesses of the tray table legs. The first and second pivot studs have first and second opposed arcuate segments and first and second opposed flat segments. The arcuate segments are dimensioned to be retained in the stud receiving recess and the flat segments are dimensioned to clear the stud receiving recess whereby the tray table can be removed from the pivot studs. The arcuate segments are positioned on the pivot studs to retain the tray table legs on the pivot studs when the seat is in the seating position and the flat segments positioned on the pivot studs to permit removal of the tray table when the seat back is in the break-back position.

7 Claims, 10 Drawing Sheets

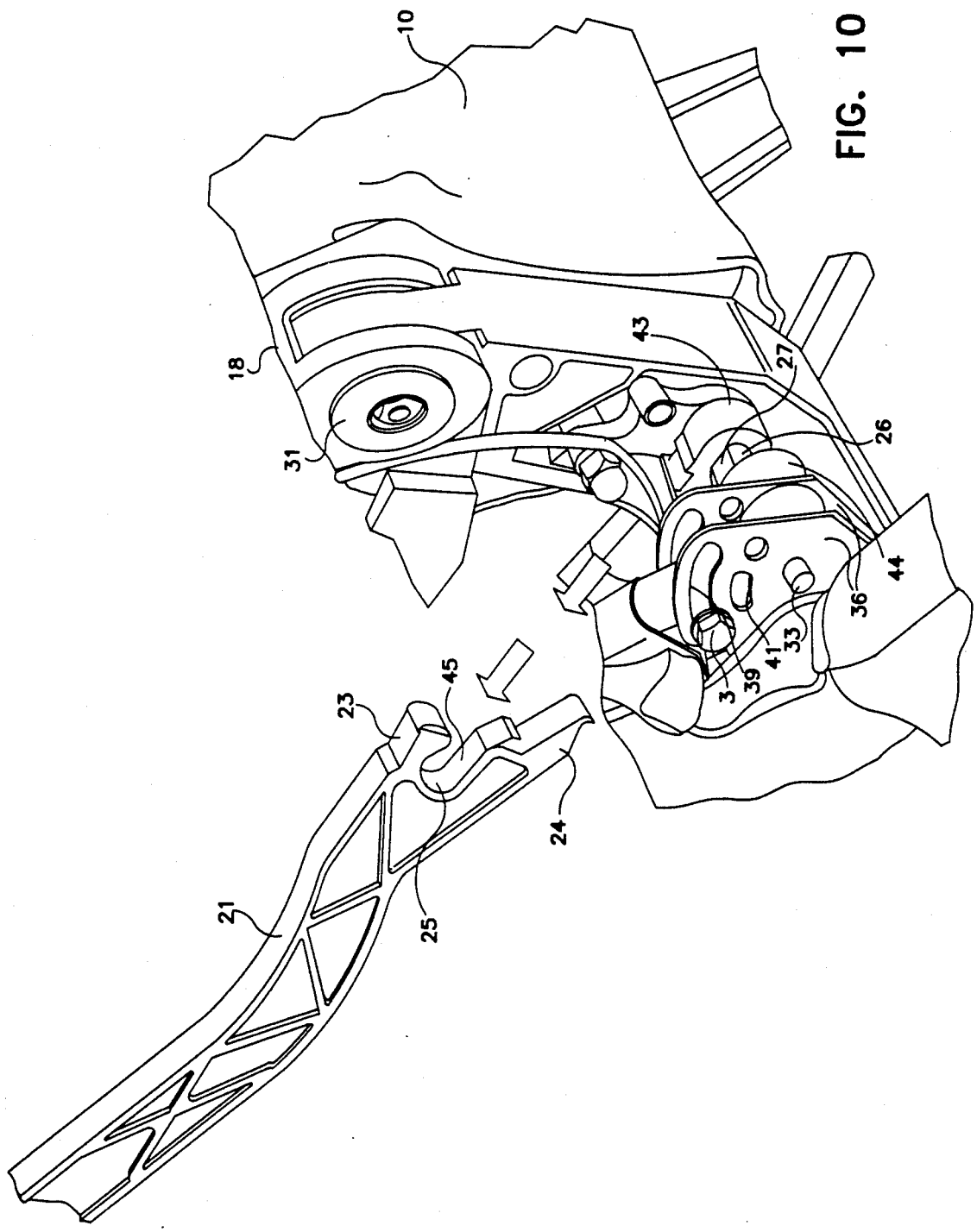

SEAT BACK TRAY TABLE ASSEMBLY HAVING OPEN-ENDED CONNECTOR LEGS

TECHNICAL FIELD AND BACKGROUND OF THE INVENTION

This invention relates to a seat back tray table assembly for use on a passenger seat such as used in a passenger aircraft. A conventional tray table is generally mounted to the seat frame of a seat and is movable as desired between a storage position latched against the seat back and a use position where the tray table is lowered to provide a horizontal supporting surface. The tray table is made of lightweight plastic and is subject to ordinary wear and damage from abuse. The aluminum legs of the tray table assembly are also subject to bending due to overloading. Replacement of the tray table conventionally requires substantial time, several tools and the disassembly of several parts. U.S. Pat. No. 4,511,178 discloses two embodiments of a quick release tray table assembly.

In the first embodiment the lower ends of the table legs include a relatively small diameter upper opening joined by a parallel-sided restricted width slot of a smaller dimension to a relatively large diameter lower opening. A pivot stud having a cylindrical outer end portion is fixed against rotation to each frame member. The pivot end portions are interrupted by a pair of opposed parallel flats. The pivot stud can be removed from its normal position within the slot when the seat back is in a break back position. The stud is moved into the lower opening and the legs are then deflected inwardly to remove the stud from the opening.

In the second embodiment a torsion bar is used to lend rigidity to the legs and maintain the legs in a spread position. The tray table can be removed whether or not the seat back is in the break back position. Pivot studs on the seat frame members which support the two table legs are axially aligned with each other and are spaced to fit within axially aligned apertures formed in the two legs of the tray table assembly. Removal is accomplished by deflecting the legs inwardly against the counter thrust of the torsion bar.

Both of these embodiments require inward deflection of the tray table legs. This places strain on the legs and on the mountings of the legs to the tray table. Rough handling during removal of the tray table assembly can damage the mountings thereby making repair and reuse of the components more difficult or impractical.

SUMMARY OF THE INVENTION

Therefore, it is an object of the invention to provide a seat back tray table assembly which is quickly and easily removal for replacement or repair.

It is another object of the invention to provide a seat back tray table assembly which is removable without deflecting the legs inwardly towards each other.

It is another object of the invention to provide a seat back tray table assembly which is removable by movement of the legs of the tray table in the plane of mounting.

These and other objects of the present invention are achieved in the preferred embodiments disclosed below by providing a seat-back tray table assembly attached to a vehicle passenger seat including a seat bottom, seat back and seat frame. The tray table assembly comprises a tray table, a pair of elongate legs on which the tray table is mounted between a range of movement from a storage position against a seat-back of the vehicle passenger seat and a lowered use position, and a tray table assembly removal position at which the tray table is removable from the seat for repair or replacement.

The legs include respective first and second extensions projecting outwardly from the free end of the pair of legs remote from the tray table and define respective stud-receiving recesses between the first and second extensions. Seat back pivot means mount the seat back on the seat frame for pivotal movement between a seating position with the seat back substantially upright and substantially perpendicular to the seat bottom and a break-back position with the seat back forward and substantially parallel to the seat bottom.

Locking means are provided for normally locking the seat back in the seating position. Tray table pivot means are carried on the seat frame and comprise first and second pivot studs positioned on respective sides of the seat frame for being received in the stud receiving recesses of the tray table legs. The first and second pivot studs have first and second opposed arcuate segments and first and second opposed flat segments. The arcuate segments are dimensioned to be retained in the stud receiving recess and the flat segments are dimensioned to clear the stud receiving recess whereby the tray table can be removed from the pivot studs. The arcuate segments are positioned on the pivot studs to retain the tray table legs on the pivot studs when the seat is in the seating position and the flat segments positioned on the pivot studs to permit removal of the tray table when the seat back is in the break-back position.

According to one preferred embodiment of the invention, the assembly includes first and second spacers of enlarged dimension positioned in spaced-apart relation on the pivot stud for receiving the leg extensions therebetween and for maintaining the leg extensions in alignment on the pivot studs by preventing lateral deflection of the tray table legs.

Preferably, the spacers are constructed of nylon.

According to another preferred embodiment of the invention, the assembly includes friction means for applying drag to the movement of the seat back from the seat back use position and the break-back position.

According to yet another preferred embodiment of the invention, the friction means comprise first and second friction plates positioned on opposite sides of a seat frame member carrying the seat back.

According to one preferred embodiment of the invention, the assembly includes wear protection means positioned adjacent the respective first and second extensions within the recesses.

BRIEF DESCRIPTION OF THE DRAWINGS

Some of the objects of the invention have been set forth above. Other objects and advantages of the invention will appear as the invention proceeds when taken in conjunction with the following drawings, in which:

FIGS. 7-10 are fragmentary sequential perspective views showing removal of the seat back tray table.

DESCRIPTION OF THE PREFERRED EMBODIMENT AND BEST MODE

Figure 1:
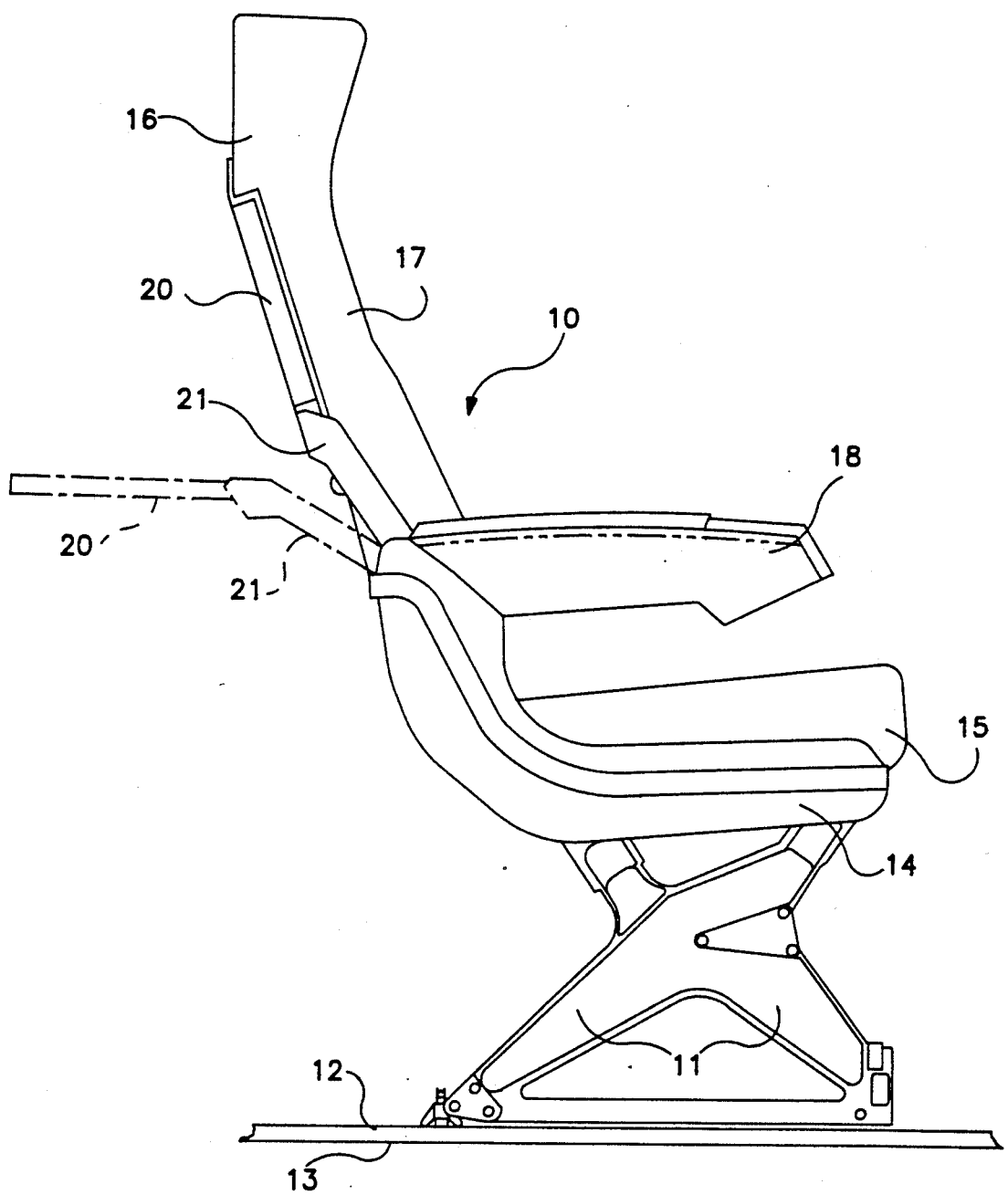
FIG. 1 is a side elevation of a passenger seat including a seat back tray table assembly according to an embodiment of the invention.

Referring now specifically to the drawings, a passenger seat and a seat back tray table assembly according to the present invention is illustrated in FIG. 1 and shown generally at reference numeral 10. Seat 10 includes legs 11 which are secured to tracks 12 in the floor 13 of the aircraft. The legs 11 support a seat chassis which includes a seat bottom 14 and an overlying seat bottom cushion 15. A seat back 16 is mounted for limited pivotal movement to the seat bottom 14, and is covered on its front side with a back seat cushion 17. An armrest 18 is provided for passenger comfort.

A seat back tray table 20 is secured to a pair of spaced-apart aluminum legs 21 (one shown). In the upright position, the tray table 20 is latched into a stowage position against the seat back 16 of the seat 10. In its use position (shown in phantom lines) the tray table 20 is suspended by the legs 21 over the lap of the passenger seated in another seat (not shown) to the rear of seat 10.

Figure 2:
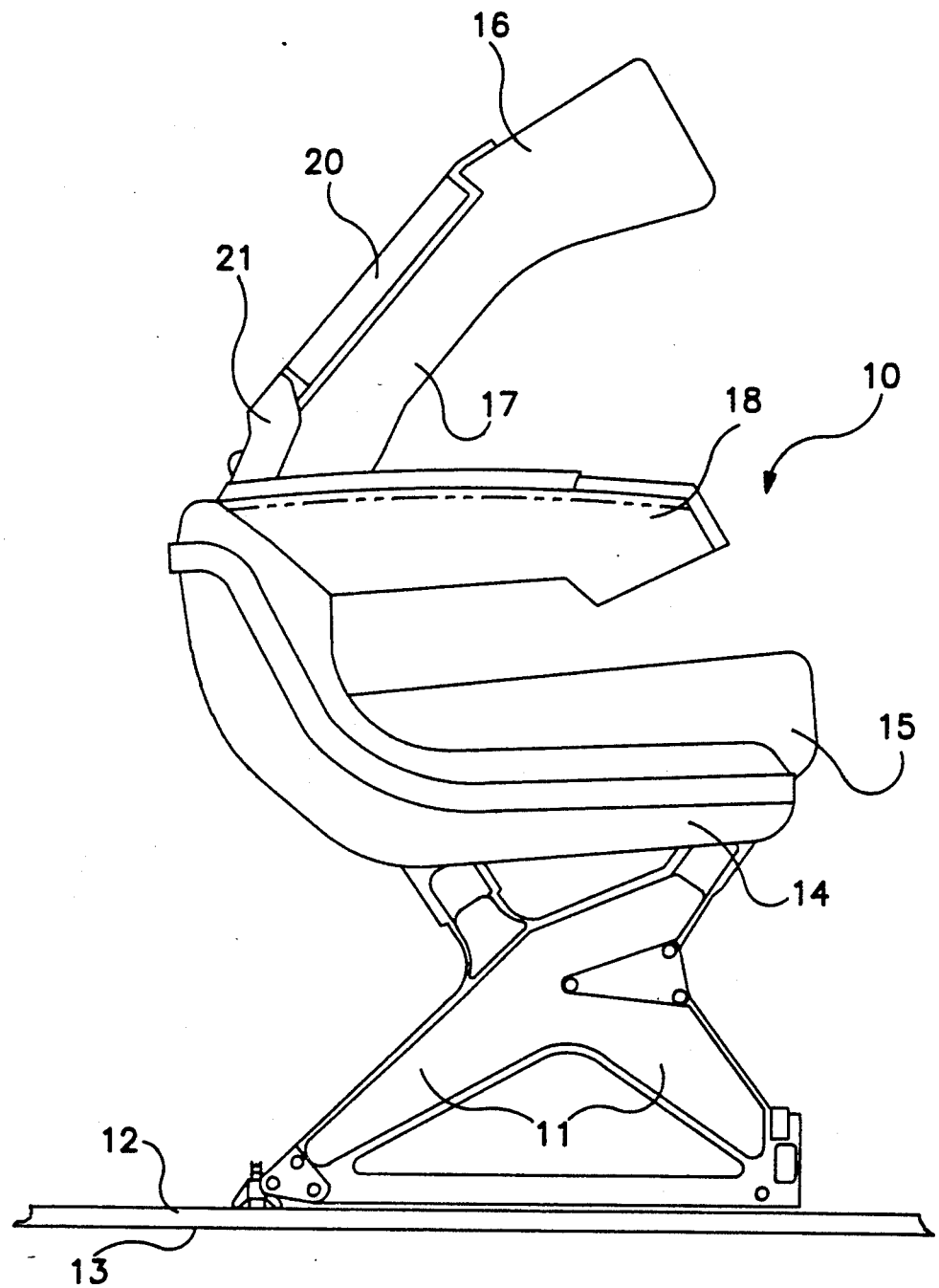
FIG. 2 is a side elevation of the seat in FIG. 1 moving towards the break back position.
Figure 3:
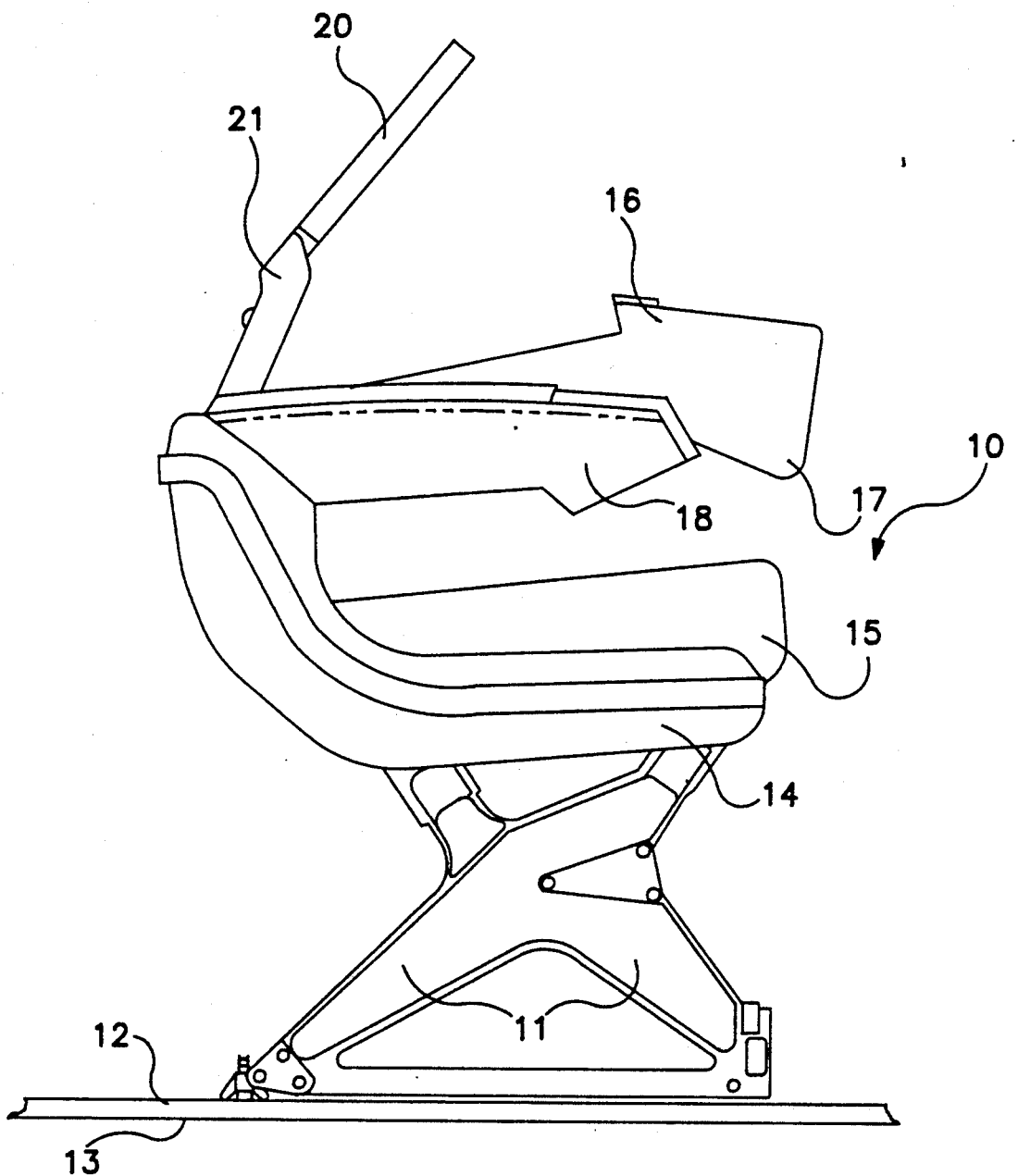
FIG. 3 is a side elevation of the seat in FIG. 1 in the break back position.
Figure 4:
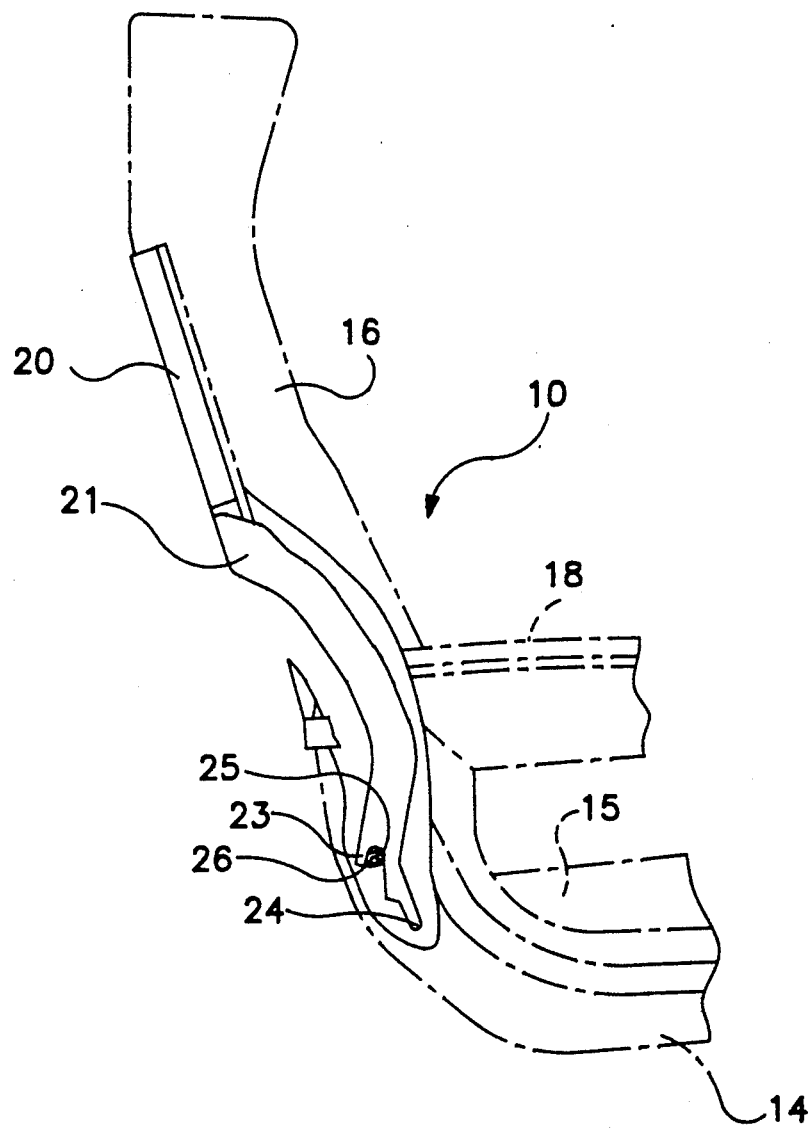
FIGS. 4–6 are simplified sequential fragmentary side elevation views showing removal of the seat back tray table.

When it is necessary to remove the tray table assembly, the seat 10 is moved into a break back position, as is shown in FIGS. 2 and 3. As is shown in FIG. 4, the lower end of legs 21 includes first and second extensions 23, 24 defining between them a recess 25. Recess 25 is shaped to receive a pivot stud 26 on which the tray table 20 is pivoted. Pivot stud 26 remains in a locked position in relation to the pivoting legs 21. Both sides of the tray table assembly are held as described above, one side being shown. It is understood that the description is applicable to both sides.

Figure 5:
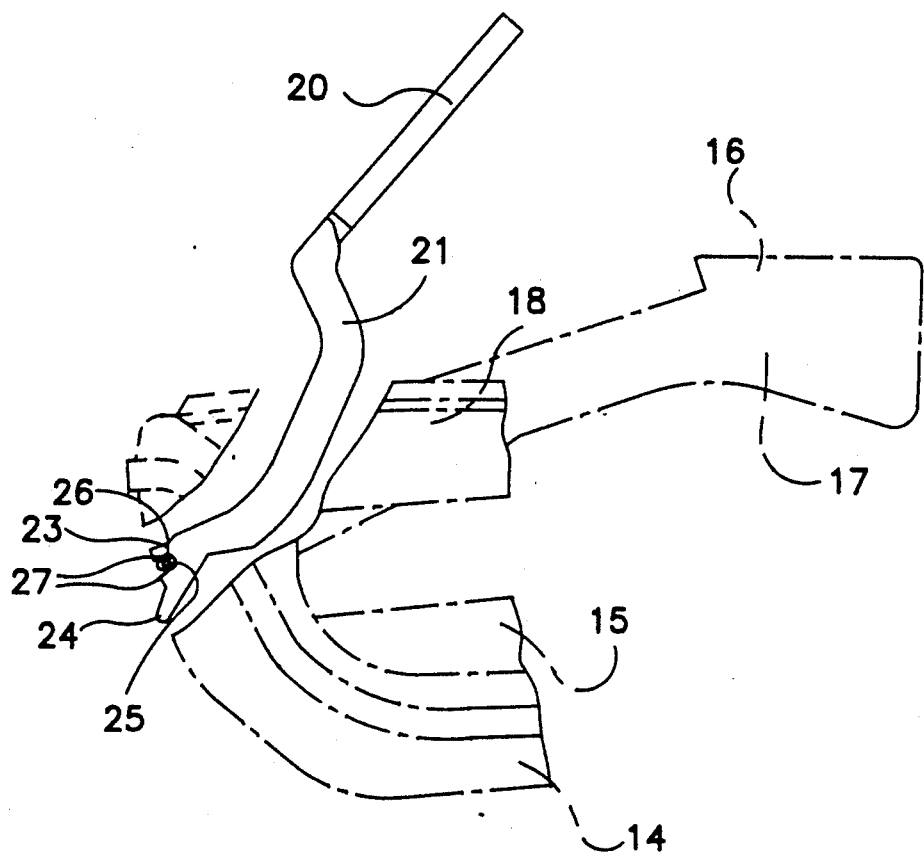
Figure 6:
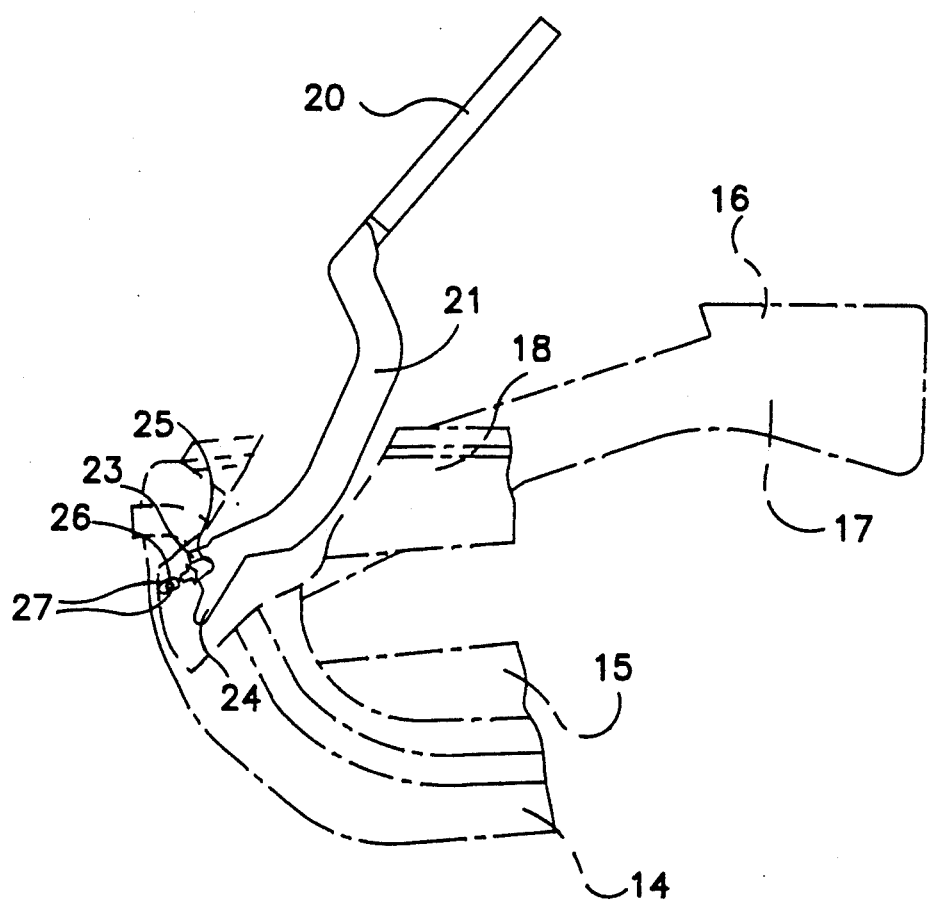

As is shown in FIG. 5, when seat back 16 is in its break back position, tray table 20 is unlatched from the seat back 16 and moved to the position shown. At the point, flats on opposite sides of pivot stud 26 align with the longitudinal extent of the recess 25 and permit the pivot stud 26 to clear the opening of recess 25. As is shown in FIG. 6, this alignment permits legs 21 and the tray table 20 attached to legs 21 to be removed from the pivot stud 26. Note that no deflection of the legs 21 is required. The legs slip off of the pivot studs 26 without any additional stress or strain on the parts of the assembly. Of course, a replacement seat back tray table assembly is installed in the same manner by reversing the process described above.

Referring now to FIGS. 7-10, a more detailed description is provided of the structure and the steps carried out to remove and replace the tray table assembly.

Figure 7:
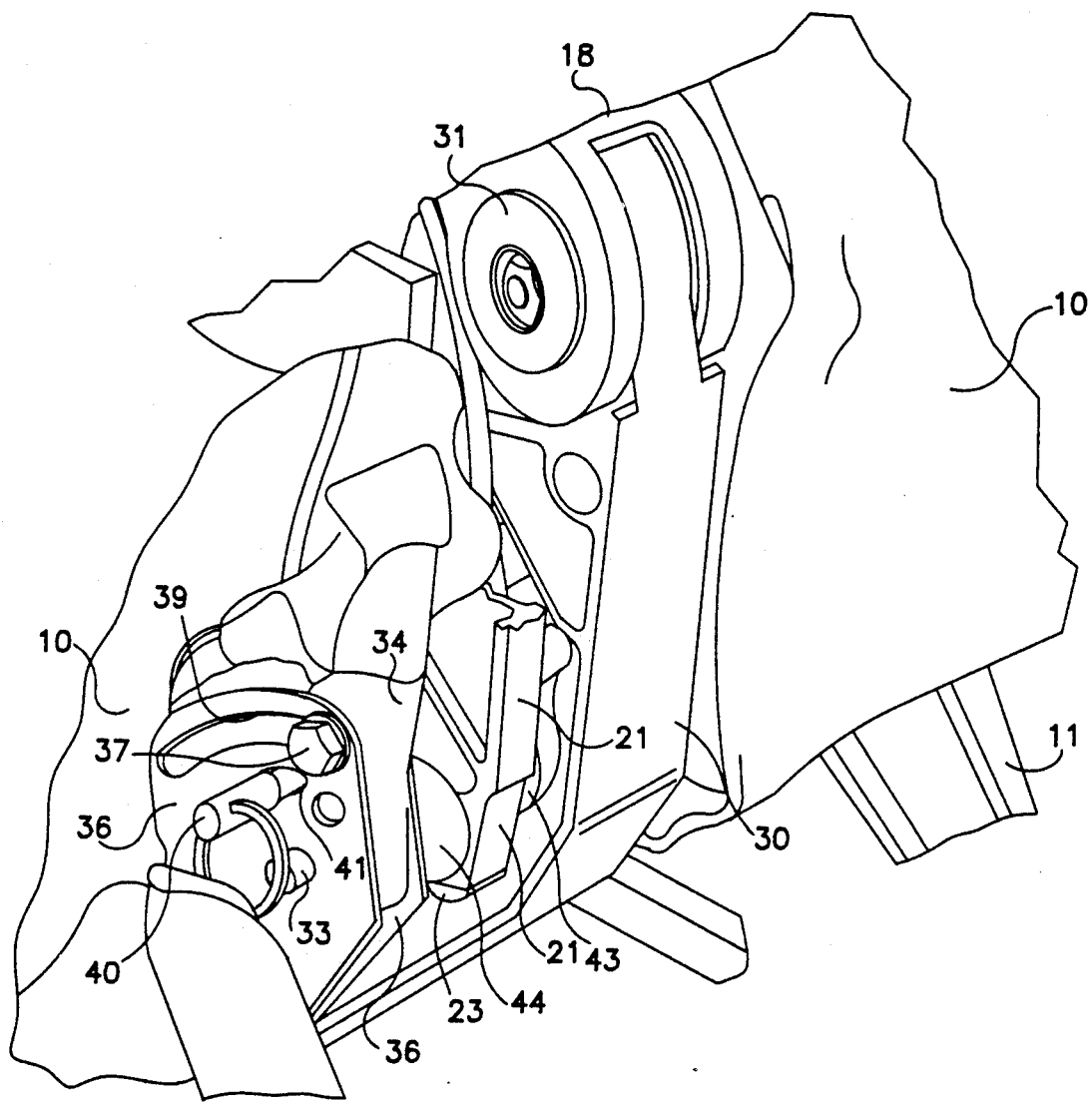

FIG. 7 illustrates the area between two seats, substantial parts of which are broken away, where one of the legs 21 is positioned. The seat chassis includes a mounting 30 with a pivot 31 on which arm rest 18 is mounted for movement between a lowered use position and a raised position where the arm rest 18 is stowed between the two seat backs. The mechanism shown in the drawings is normally covered by the seat upholstery, and is exposed by maintenance crew when seat maintenance is required.

The seat back 16 pivots around a pivot shaft 33, an extension of the pivot stud 26, which extends through a seat back support tube 34. The pivot shaft 33 cooperates with a pair of friction plates 35 and 36. The seat back support tube 34 is positioned between and pivots between friction plates 35 and 36. A bolt 37 rides within an arcuate slots 39 in each of the friction plates 35, 36 as the seat back 16 is adjusted. During normal use the forward movement of the seat back 16 is limited by a locking pin 40 which is positioned in a locking pin hole 41 through the friction plates 35 and 36. Resistance is controlled by tightening the bolt 37, thereby pinching the support tube 34 between friction plates 35, 36 to the correct resistance.

Figure 8:
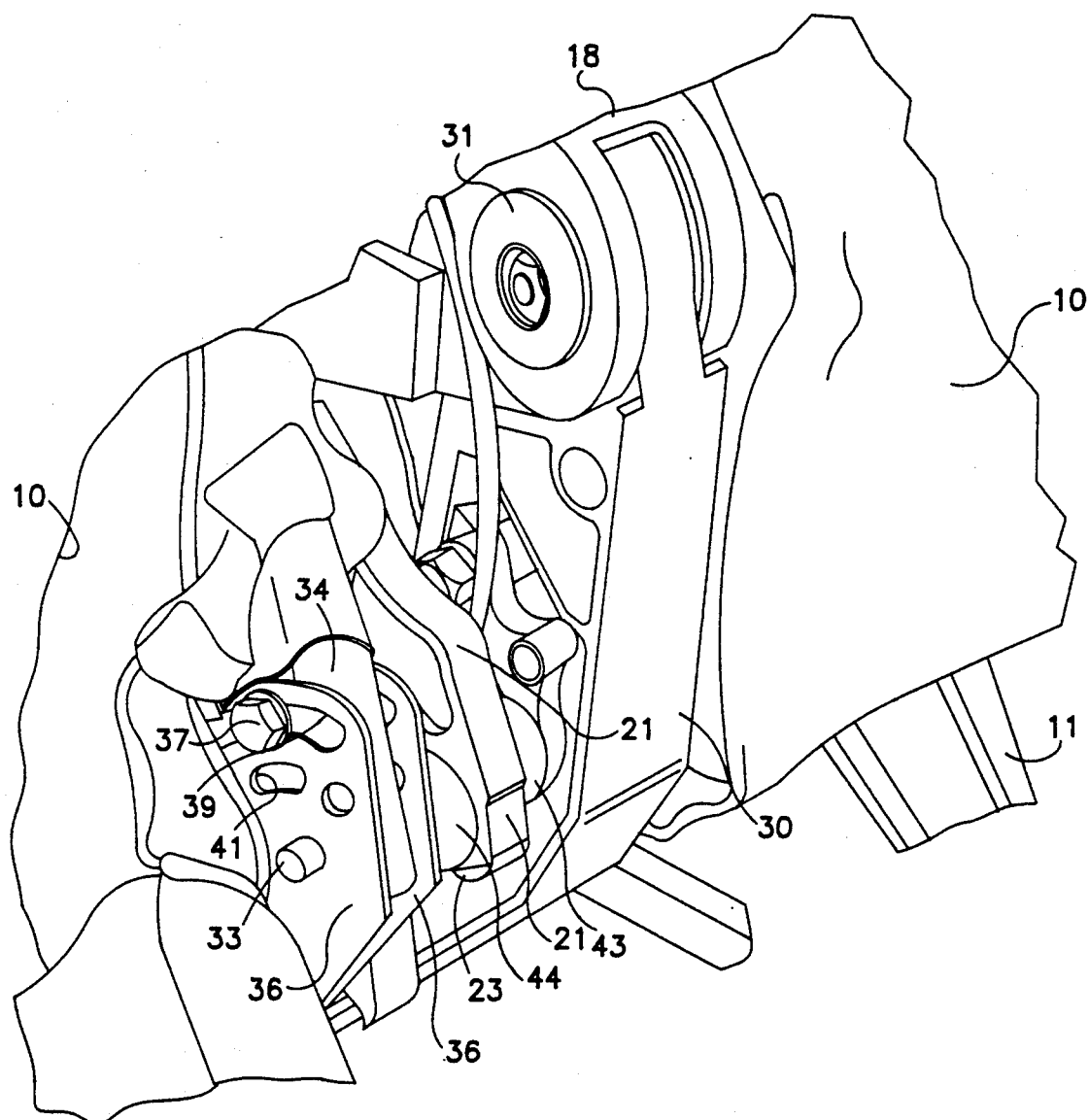
Figure 9:
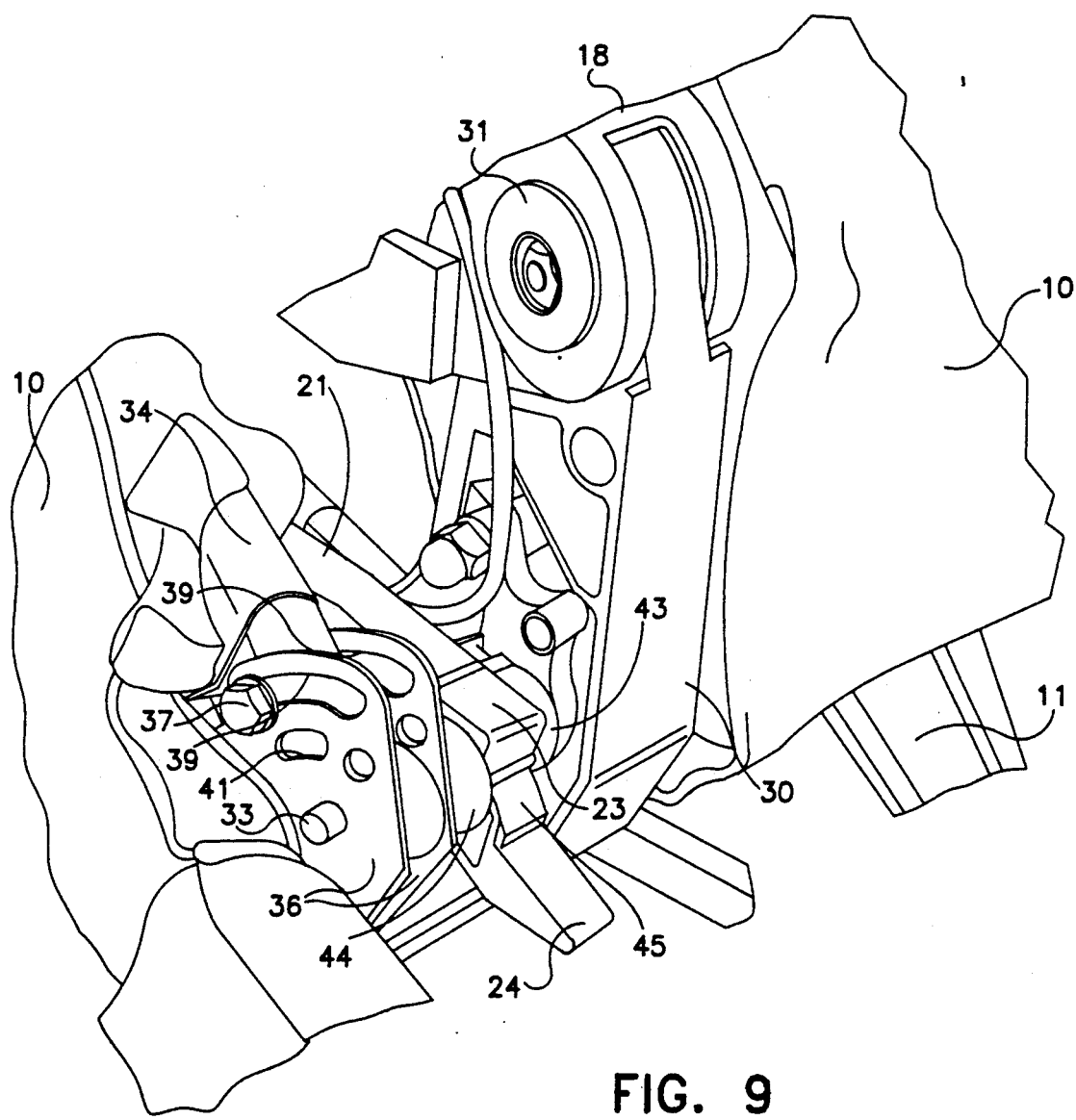

The locking pin 40 is removed when the tray table 20 to be detached and replaced. Removal of the locking pin 40 permits the seat back 16 to be pushed progressively forward into the break back position, as is shown in FIGS. 8, 9 and 10. The resistance created by the friction plates 35, 36 requires that the seat be pushed forward with a relatively heavy pressure of 25 pounds or more.

As is best shown in FIGS. 9 and 10, pivot stud 26 includes a pair of nylon spacers 43, 44 which maintain alignment of the tray table legs 21 and prevent any deflection of the legs, either when installed or during removal or reinstallation. Pivot stud 26 and the surrounding spacers 43, 44 do not rotate with the pivoting movement of the seat back 16, but remain stationary, so that flats 27 on pivot stud 26 ar always in the same position with reference to the position of the seat chassis. Pivot stud 2 also includes a thin steel deflector strip 45 which is formed into a shape which fits into recess 25. Deflector strip 45 protects the relatively soft aluminum material of the legs 21 from wear and eventual wallowing out from pivotal movement of the tray table legs 21 around pivot stud 26 during normal passenger use.

Described in sequence, removal of the tray table proceeds by first pulling aside the upholstery to expose the components shown in FIGS. 7-10. The seat back 16 is initially in the position shown in FIG. 7. The locking pin 40 is removed, permitting movement of the seat back 16 forward, as is shown in FIG. 8. When the seat back 16 has reached the position shown in FIG. 9, the leg extensions 23 and 24 defining the recess 25 have rotated on pivot stud 26 to the point where the narrowest point between extensions 23 and 24 is aligned with the plane of the flats 27. In this position, the pivot stud 26 will clear the opposed extensions 23 and 24 when the tray table 20 and attached legs 21 are translated along the plane of the flats 27. This movement is shown from opposite sides in FIG. 10. By use of this construction simple and quick removal of the seat back tray table assembly is achieved. No tools are required. In addition, deflection of the legs 21 which can cause further damage to the tray table assembly is avoided. A seat back tray table assembly is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A seat-back tray table assembly for being removably attached to a vehicle passenger seat including a seat bottom, seat back and seat frame, said tray table assembly comprising:

(a) a tray table;
    (b) a pair of elongate legs on which said tray table is mounted between a range of movement from a storage position against a seat-back of the vehicle passenger seat and a lowered use position, and a tray table assembly removal position at which the tray table is removable from the seat for repair or replacement, said legs including respective first and second extensions projecting outwardly from the free end of the pair of legs remote from said tray table and defining respective opened-ended stud-receiving recesses between said first and second extensions;

(c) seat back pivot means mounting said seat back on said seat frame for pivotal movement between a seating position with the seat back substantially upright and substantially perpendicular to the seat bottom and a break-back position with the seat back forward and substantially parallel to the seat bottom and including locking means for releasably locking said seat back in said seating position;

(d) tray table pivot means carried on said seat frame and comprising first and second pivot studs positioned on respective sides of said seat frame for being received in said open-ended stud receiving recesses of said tray table legs, said first and second pivot studs having first and second opposed arcuate segments and first and second opposed flat segments, said arcuate segments dimensioned to be retained in said stud receiving recess and said flat segments dimensioned to clear said open-ended stud receiving recess whereby the tray table can be removed from the pivot studs by pulling the tray table away from the pivot studs in a direction generally perpendicular to the longitudinal axis of the pivot studs to permit the pivot studs to exit the open-ended respective recesses, said arcuate segments positioned on said pivot studs to retain said tray table legs on said pivot studs when the seat is in the seating position and said flat segments positioned on said pivot studs to permit removal of said tray table when said seat back is unlocked and said seat back is in the break-back position.

2. A seat back tray table assembly according to claim 1, and including respective first and second spacers of enlarged dimension positioned in spaced-apart relation on said respective pivot studs for receiving said leg extensions therebetween and for maintaining said leg extensions in alignment on said pivot studs by preventing lateral deflection of said tray table legs.

3. A seat back tray table assembly according to claim 2, wherein said spacers are constructed of nylon.

4. A seat back tray table assembly according to claim 1, and including friction means for applying drag to the movement of the seat back from the seat back use position to the break-back position and from the break-back position to the seat back use position.

5. A seat back tray table assembly according to claim 4, wherein said friction means comprise first and second friction plates positioned on opposite sides of a seat frame member carrying said seat back.

6. A seat back tray table assembly according to claim 1, and including wear protection means positioned adjacent said respective first and second extensions within said recesses.

7. In combination with the seat back tray table assembly according to claims 1, 2, 3, 4, 5 or 6, a vehicle passenger seat to which the seat back tray table is removably attached for use.

* * * * *